(12) United States Patent
Ebnöther et al.

(10) Patent No.: US 10,507,875 B1
(45) Date of Patent: Dec. 17, 2019

(54) TRAILER WALL INCLUDING LOGISTICS POST

(71) Applicant: CELLTECH METALS, INC., Searcy, AR (US)

(72) Inventors: Fabien Ebnöther, Munich (DE); Douglas P Cox, Oceanside, CA (US)

(73) Assignee: Celltech Metals Inc., Searcy, AR (US)

( * ) Notice: Subject to any disclaimer, the term of this patent is extended or adjusted under 35 U.S.C. 154(b) by 0 days.

(21) Appl. No.: 16/229,289

(22) Filed: Dec. 21, 2018

(51) Int. Cl.
| | |
|---|---|
| *B62D 33/04* | (2006.01) |
| *B21D 39/02* | (2006.01) |
| *B21B 1/22* | (2006.01) |
| *B32B 3/12* | (2006.01) |
| *B32B 7/12* | (2006.01) |
| *B32B 15/04* | (2006.01) |
| *B32B 3/04* | (2006.01) |
| *B32B 3/06* | (2006.01) |
| *B32B 3/28* | (2006.01) |
| *B32B 15/08* | (2006.01) |

(52) U.S. Cl.
CPC .............. *B62D 33/046* (2013.01); *B21B 1/22* (2013.01); *B21D 39/02* (2013.01); *B32B 3/04* (2013.01); *B32B 3/06* (2013.01); *B32B 3/12* (2013.01); *B32B 3/28* (2013.01); *B32B 7/12* (2013.01); *B32B 15/043* (2013.01); *B32B 15/08* (2013.01); *B32B 2250/40* (2013.01); *B32B 2605/00* (2013.01); *B32B 2607/00* (2013.01)

(58) Field of Classification Search
CPC ........ B62D 33/046; B21B 1/22; B21D 39/02; B32B 15/08; B32B 2250/40; B32B 2607/00; B32B 3/28; B32B 3/06; B32B 3/04; B32B 15/043; B32B 7/12; B32B 3/12; B32B 2605/00
USPC ...................................................... 296/186.1
See application file for complete search history.

(56) References Cited

U.S. PATENT DOCUMENTS

| | | |
|---|---|---|
| 782,558 A | 2/1905 | Hahn |
| 2,087,010 A | 7/1937 | Wardle |
| 2,391,997 A | 1/1946 | Noble |
| 2,441,476 A | 5/1948 | Ewald |

(Continued)

FOREIGN PATENT DOCUMENTS

| | | |
|---|---|---|
| GB | 2182703 A | 5/1987 |
| WO | WO-2015/148707 A1 | 10/2015 |

OTHER PUBLICATIONS

Kim, Jang-Kyo, et al.; "Forming and failure behaviour of coated, laminated and sandwiched sheet metals: a review", *Journal of Materials Processing Technology*, 63, 1997, pp. 33-42.

(Continued)

*Primary Examiner* — Pinel E Romain
(74) *Attorney, Agent, or Firm* — Harness, Dickey & Pierce, PLC

(57) ABSTRACT

A trailer wall apparatus includes at least one logistics post. In another aspect, a vertically elongated cargo-securing or logistics post is attached adjacent to a vertically elongated depression within a sandwich panel of a cargo container, the sandwich panel employing at least one core sheet including alternating peaks and valleys therein in addition to attached interior and exterior face sheets. A further aspect employs a logistics post including internal lips which contact against and/or assist with alignment to diagonal surfaces of a depression in a container or trailer wall.

27 Claims, 15 Drawing Sheets

(56) References Cited

U.S. PATENT DOCUMENTS

| | | |
|---|---|---|
| 2,481,046 A | 9/1949 | Scurlock |
| 2,605,064 A | 7/1952 | Davis |
| 2,738,297 A | 3/1956 | Pfisterhammer |
| 2,809,908 A | 10/1957 | French |
| 2,950,788 A | 8/1960 | Edgar |
| 3,013,641 A | 12/1961 | Compton |
| 3,071,853 A | 1/1963 | Price et al. |
| 3,086,899 A | 4/1963 | Smith |
| 3,151,712 A | 10/1964 | Jackson |
| 3,173,383 A | 3/1965 | Eggert |
| 3,217,845 A | 11/1965 | Reynolds |
| 3,227,598 A | 1/1966 | Robb |
| 3,432,859 A | 3/1969 | Jordan |
| 3,481,642 A | 12/1969 | Campbell |
| 3,525,663 A | 8/1970 | Hale |
| 3,597,891 A | 8/1971 | Martin |
| 3,742,663 A | 7/1973 | Duskin |
| 3,757,559 A | 9/1973 | Welsh |
| 3,834,487 A | 9/1974 | Hale |
| 3,865,679 A | 2/1975 | Hale |
| 3,876,492 A | 4/1975 | Schott |
| 3,914,486 A | 10/1975 | Borgford |
| 3,938,963 A | 2/1976 | Hale |
| 3,950,259 A | 4/1976 | Pallo et al. |
| 4,025,996 A | 5/1977 | Saveker |
| 4,044,186 A | 8/1977 | Stangeland |
| 4,049,855 A | 9/1977 | Cogan |
| 4,077,247 A | 3/1978 | Stewart |
| 4,275,663 A | 6/1981 | Sivachenko et al. |
| 4,344,995 A | 8/1982 | Hammer |
| 4,356,678 A | 11/1982 | Andrews et al. |
| 4,411,121 A | 10/1983 | Blacklin et al. |
| 4,635,992 A | 1/1987 | Hamilton et al. |
| 4,718,214 A | 1/1988 | Waggoner |
| 4,910,065 A | 3/1990 | McKinney |
| 5,030,488 A | 7/1991 | Sobolev |
| 5,195,580 A | 3/1993 | Hoeffken |
| 5,366,787 A | 11/1994 | Yasui et al. |
| 5,580,637 A | 12/1996 | Konta et al. |
| 5,678,715 A | 10/1997 | Sjostedt et al. |
| 5,791,118 A | 8/1998 | Jordan |
| 5,860,693 A | 1/1999 | Ehrlich |
| 5,887,402 A | 3/1999 | Ruggie et al. |
| 6,183,879 B1 | 2/2001 | Deeley |
| 6,220,651 B1 | 4/2001 | Ehrlich |
| 6,257,043 B1 | 7/2001 | Wiens |
| 6,412,854 B2 | 7/2002 | Ehrlich |
| 6,450,564 B1 * | 9/2002 | Sill .................. B62D 25/02 296/186.1 |
| 6,547,280 B1 | 4/2003 | Ashmead |
| 6,846,559 B2 | 1/2005 | Czaplicki et al. |
| 6,908,143 B2 | 6/2005 | Ashmead |
| 6,928,848 B2 | 8/2005 | Golovashchenko et al. |
| 6,939,599 B2 | 9/2005 | Clark |
| 6,959,959 B1 | 11/2005 | Roush |
| 7,010,897 B1 | 3/2006 | Kuppers |
| 7,025,408 B2 | 4/2006 | Jones et al. |
| 7,100,971 B2 | 9/2006 | Pines |
| 7,214,018 B2 | 5/2007 | Lussier |
| 7,267,393 B2 | 9/2007 | Booher |
| 7,401,844 B2 | 7/2008 | Lemmons |
| 7,527,325 B2 | 5/2009 | Yurgevich |
| 7,621,589 B1 | 11/2009 | Gerome |
| 7,648,058 B2 | 1/2010 | Straza |
| 7,752,729 B2 | 7/2010 | Faehrrolfes et al. |
| 7,753,264 B2 | 7/2010 | Straza |
| 7,757,931 B2 | 7/2010 | Straza |
| 7,798,447 B2 | 9/2010 | Frantz et al. |
| 7,927,708 B2 | 4/2011 | Mizrahi |
| 7,931,328 B2 | 4/2011 | Lewallen et al. |
| 8,016,152 B2 | 9/2011 | Roush et al. |
| 8,205,642 B2 | 6/2012 | Straza |
| 8,419,110 B2 | 4/2013 | Katz et al. |
| 8,426,010 B2 | 4/2013 | Stadthagen-Gonzalez |
| 8,434,472 B2 | 5/2013 | Hanson et al. |
| 8,506,221 B2 | 8/2013 | Pattison et al. |
| 8,540,099 B2 | 9/2013 | Roush |
| 8,580,061 B2 | 11/2013 | Cik |
| 8,835,016 B2 | 9/2014 | Ebnoether |
| 9,067,729 B2 | 6/2015 | Fenton |
| 9,764,780 B2 | 9/2017 | Zehner et al. |
| 9,884,660 B2 | 2/2018 | Fenton |
| 9,884,661 B2 | 2/2018 | Fenton |
| 9,925,736 B2 | 3/2018 | Cox et al. |
| 10,112,248 B2 | 10/2018 | Gould et al. |
| 10,124,555 B2 | 11/2018 | Ebnother et al. |
| 10,144,582 B2 | 12/2018 | Ebnother et al. |
| 2003/0080586 A1 | 5/2003 | Ehrlich |
| 2003/0210966 A1 | 11/2003 | Haire |
| 2005/0029708 A1 | 2/2005 | Coyle |
| 2005/0084703 A1 | 4/2005 | Ashmead |
| 2005/0230033 A1 | 10/2005 | Faehrrolfes et al. |
| 2007/0114269 A1 | 5/2007 | Straza |
| 2008/0292898 A1 | 11/2008 | Straza |
| 2009/0053548 A1 | 2/2009 | Straza |
| 2009/0159592 A1 | 6/2009 | Vitalis et al. |
| 2011/0204678 A1 * | 8/2011 | Katz .................. B62D 33/046 296/186.1 |
| 2012/0234470 A1 | 9/2012 | Nishio et al. |
| 2012/0305217 A1 | 12/2012 | Cowburn et al. |
| 2013/0224419 A1 * | 8/2013 | Lee .................. B32B 3/06 428/57 |
| 2013/0244006 A1 | 9/2013 | Ebnoether |
| 2013/0330521 A1 | 12/2013 | Ebnoether |
| 2015/0044494 A1 | 2/2015 | Ebnoether |
| 2015/0078804 A1 | 3/2015 | Ehrlich |
| 2015/0165724 A1 | 6/2015 | Cox et al. |
| 2017/0036415 A1 | 2/2017 | Ebnother et al. |
| 2017/0274465 A1 | 9/2017 | Gould et al. |
| 2017/0327310 A1 | 11/2017 | Ebnother et al. |
| 2018/0170449 A1 | 6/2018 | Cox et al. |
| 2018/0207902 A1 | 7/2018 | Cox et al. |

OTHER PUBLICATIONS

Van Straalen, Ijsbrand J.; "Comprehensive Overview of Theories for Sandwich Panels", *TNO Building and Construction Research*, 1998, pp. 48-70.

Stoffer, Harry; "Some suppliers see dollars in a higher CAFE", Automotive News, Crain Communications, Inc., Jul. 2, 2007, two pages.

Carey, John; "What's Next—Green Biz Materials of New Plastics and a Steel Sandwich", BusinessWeek, Oct. 22, 2007, one page.

". . . Honeycomb Structure Holds Potential", Autotech Daily, Apr. 15, 2008, one page.

Vasilash, Gary S.; "From Small Things: Big Differences", Automotive Design and Production, Jun. 2008, one page.

"UltraSteel" brochure published by Hadley Group in Oct. 2010, 8 pages.

Ebnoether, Fabien, et al.; "Predicting ductile fracture of low carbon steel sheets: Stress-based versus mixed stress/strain-based Mohr-Coulomb model;" International Journal of Solids and Structures 50 (2013; published online Dec. 27, 2012); pp. 1055-1066.

Photos of Hyundai "EcoCell" trailer, containing doors including CellTech LLC's three sheet steel sandwich, shown at U.S. tradeshow in Mar. 2013.

"Whiting AirCell Availability," Whiting airCell promotion, Sep. 26, 2013, three pages.

"AirCELL—Innovative Panels for the Truck & Trailer Industries", Whiting, published before Dec. 4, 2013, one page.

"Meyer—Laminating machines for technical textiles, foams, non-woven, foils, fabrics," http://www.meyer-machines.com/engl/Products/Laminating/laminating.html, printed from internet, believed to have been published prior to Dec. 13, 2013, one page.

"AirCELL The revolutionary all-steel sandwich panel that increases strength and reduces weight for trailer side walls and doors" Whiting, published prior to Nov. 2013, four pages.

Vers-a-Deck, "Poly Deckboard—Features and Configurations," Ancra International LLC, published on Dec. 20, 2018, 2 pages.

(56) References Cited

OTHER PUBLICATIONS

"Trailer Wall Panel Decking System—new partnership," Ancra International LLC, published May 2017, 1 page.
Ancra Cargo, "Series E 10' Gray Powdercoat Vertical Logistics Track," www.ancracargo.com/product/series, published Dec. 13, 2018, 1 page.
"Ancra International—Designer and Manufacturer of Cargo Restraint Systems—Catalog 220A," published 2016, 24 pages.

\* cited by examiner

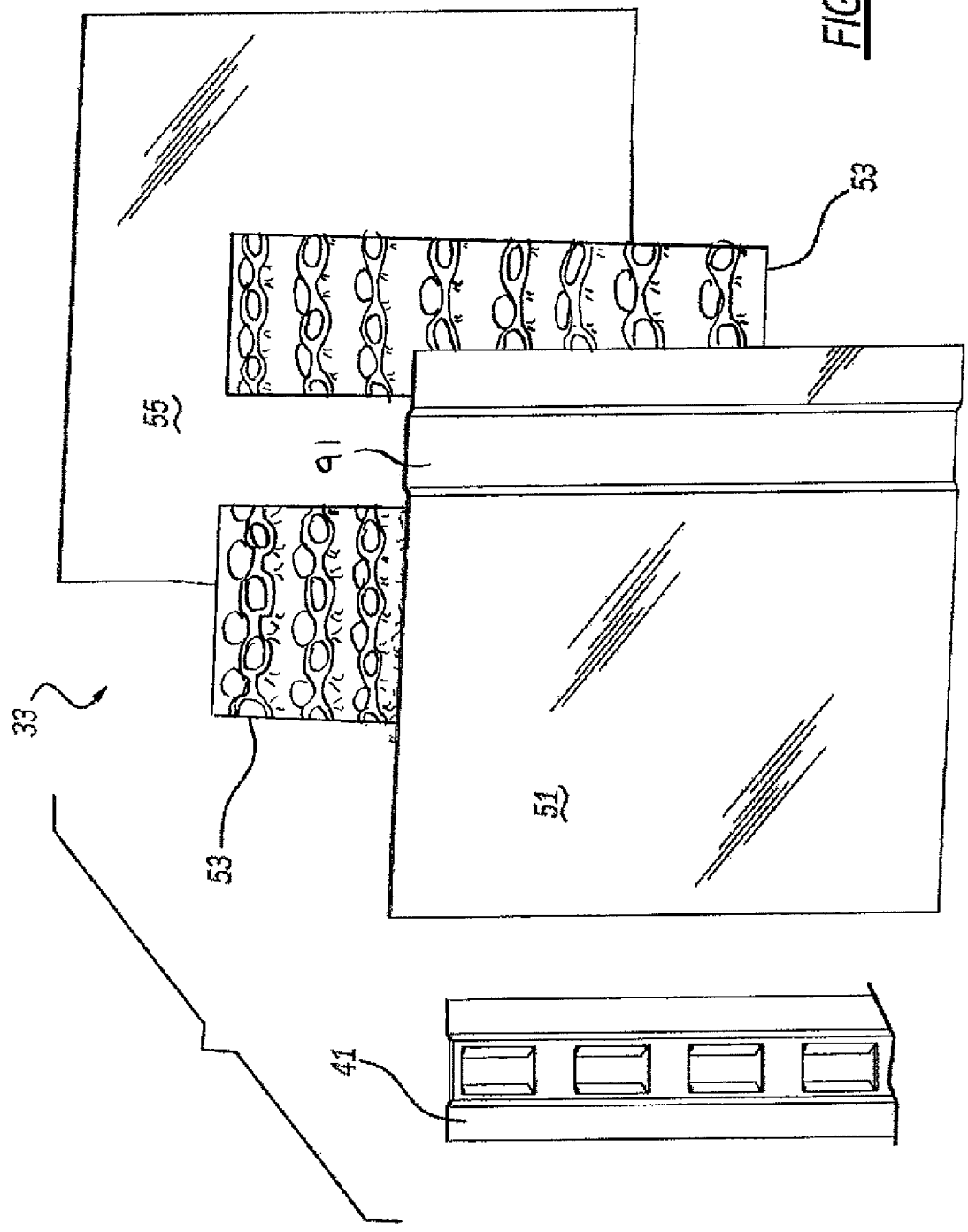

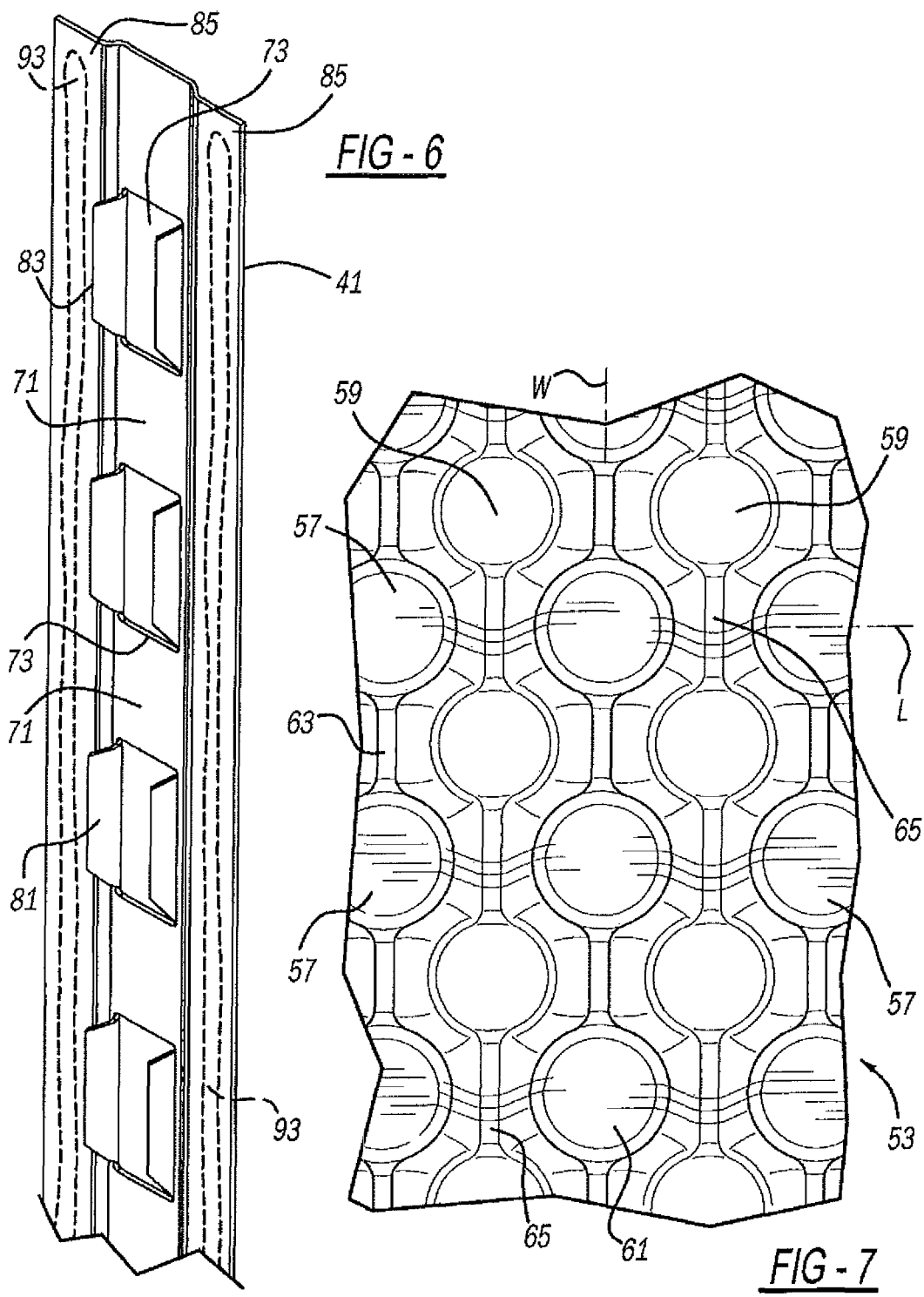

TRAILER WALL INCLUDING LOGISTICS POST

BACKGROUND

The present application relates generally to cargo containers and more particularly to a cargo trailer apparatus including a logistics post.

It has long been desired in the box trailer industry to have walls and floors made of lightweight and strong panels which are strongly joined together. Most conventional trailer walls and floors, however, require a foam filling, which is heavy and prevents recycling, thereby increasing trailer weight which wastes fuel and/or lessens cargo carrying capacity. Furthermore, traditional tracks, posts and joints are heavy, complicated and labor intensive to install. Many also greatly protrude within the cargo space and are prone to snagging by cargo when inserted in the trailer. Exemplary conventional attempts at such a construction are disclosed in the following United States patents and patent publication: U.S. Pat. No. 7,100,971 entitled "Cargo Body with Recessed Posts" which issued to Pines on Sep. 5, 2006; U.S. Pat. No. 8,016,152 entitled "Container Sidewall Connector" which issued to Roush et al. on Sep. 13, 2011; and 2013/0224419 entitled "Composite Panel and Joint Construction" which published to Lee et al. on Aug. 29, 2013. All of these are incorporated by reference herein.

It is noteworthy, however, that these conventional approaches still suffer the same snagging concerns and the panel-to-panel attachments are expensive to manufacture. Furthermore, most traditional devices require additional add-on attachment brackets which span between the adjacent panels; but these configurations typically require juggling of many loose parts, such as rivets, for side wall attachment at the trailer assembly site or dealership while attempting to align and hold the panels in position, along with undesired extra part handling and weight. The localized rivet attachment points of the posts to the side walls also undesirably concentrate the forces during use thereby creating premature wall panel fractures at the localized points. Moreover, prior panel-to-panel seams and rivet holes sometimes allow water entry such as in rainy weather which can harm the cargo transported in the container.

The prior riveting attachment of logistics tracks directly to side wall panels undesirably requires piercing of the panels and does not allow horizontally elongated track locational adjustment. The end use customers or dealerships, however, often need to subsequently move the horizontally elongated logistics tracks which requires aftermarket hole piercing for new rivets and either empty leaking, unused holes or caulking of the now unused holes, which is time consuming and unsightly. It is also difficult and cumbersome for the final trailer manufacturer to juggle and align the conventional vertical and/or horizontal logistics tracks to a vertical wall after the wall panels are assembled together.

Commonly owned U.S. Pat. No. 10,144,582, entitled "Cargo Container Apparatus Including a Sandwich Structure and a Track," discloses a C-shaped track mounted within a depression of a sandwich structure. This patent is incorporated by reference herein. While it is a significant improvement in the industry, there is room for additional improvements.

SUMMARY

In accordance with the present invention, a trailer wall apparatus includes at least one logistics post. In another aspect, a vertically elongated cargo-securing or logistics post is attached adjacent to a vertically elongated depression within a sandwich panel of a cargo container, the sandwich panel employing at least one core sheet including alternating peaks and valleys therein in addition to attached interior and exterior face sheets. A further aspect employs a logistics post including internal lips which contact against and/or assist with alignment to diagonal surfaces of a depression in a container or trailer wall. Another aspect of the present apparatus and method adhesively bond a vertically elongated logistics post adjacent to a vertically elongated depression in a wall panel, where at least a majority of the post is surface mounted outside of the depression and an air gap is present between a central portion of the post and a bottom of the depression, operable to receive a cargo-securing fastener in the gap. A method of making a trailer assembly, including a sandwich panel and a logistics post in a pre-assembled module, is also provided.

The present trailer wall apparatus and method are advantageous over prior constructions. For example, the present apparatus allows for fast and easy vertical logistics post-to-wall alignment and securing, and without rivets, screws or hole piercing of the wall. Thus, water leaks and juggling of multiple fasteners are avoided for post attachment. In one aspect, a logistics post member is secured to a sandwich wall panel member by only using adhesive and the post is then placed on top of the generally horizontal wall panel, or vice versa, prior to final trailer assembly, to allow gravity to hold the members together while the adhesive cures.

Furthermore, the present apparatus is advantageously lightweight, extremely strong and has a thin interior-to-exterior cross-section such that the vertical logistics post has a low-profile that only slightly protrudes within the interior cargo space yet allows ample fastener room on the backside thereof. In other words, a majority or all of the post is absent from and not within the sandwich wall panel's depression, yet is covering and spanning across the depression. Hence, the present apparatus makes it easier to load and unload cargo in the trailer or container without snags while enhancing the aesthetic appearance yet still providing cargo retention functionality. Furthermore, the inwardly turned lips of the post provide assembly alignment and increased strength advantages, in some embodiments, thereby making trailer assembly easier and stronger while allowing the sandwich and posts to be manufactured and pre-assembled in an initial manufacturing site different than a final trailer assembly site and well before the container or trailer is shipped to a dealer or end-use customer. Additional advantages and features of the present invention can be ascertained from the following description and appended claims, taken in conjunction with the accompanying drawings.

BRIEF DESCRIPTION OF THE FIGURES

FIG. 5 is an exploded perspective view showing the present apparatus;

FIG. 6 is a perspective view showing the post of the present apparatus viewed opposite that of FIG. 4;

FIG. 7 is a fragmentary and enlarged true elevational view of a core employed in the present apparatus;

FIG. 11 is a cross-sectional view, taken along line 11-11 of FIG. 3, showing the sandwich wall, the post and the track of the present apparatus;

DETAILED DESCRIPTION

Figure 1:
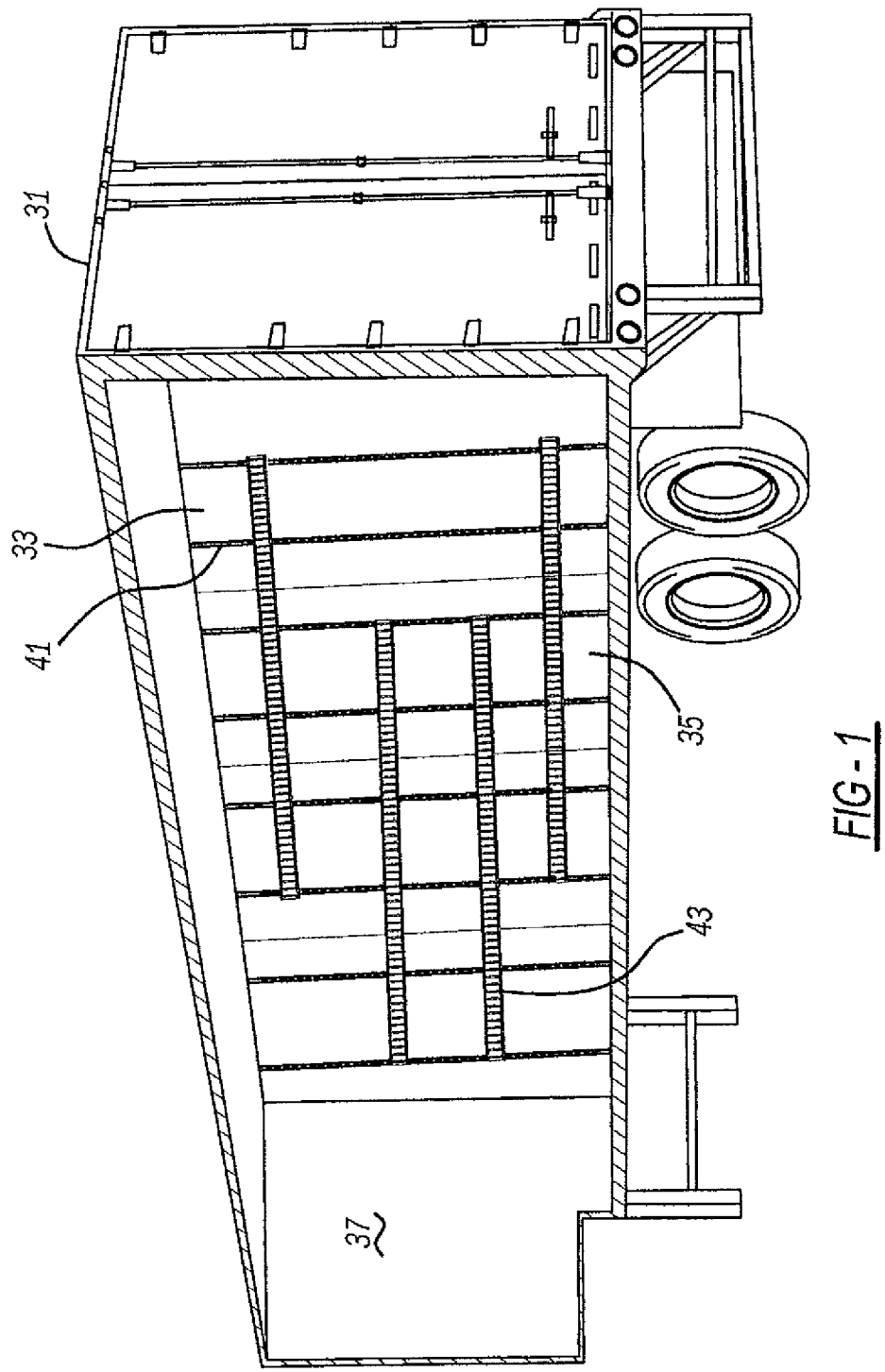
FIG. 1 is a fragmentary perspective view showing a trailer of the present apparatus employing sandwich walls, logistics posts and logistics tracks.
Figure 2:
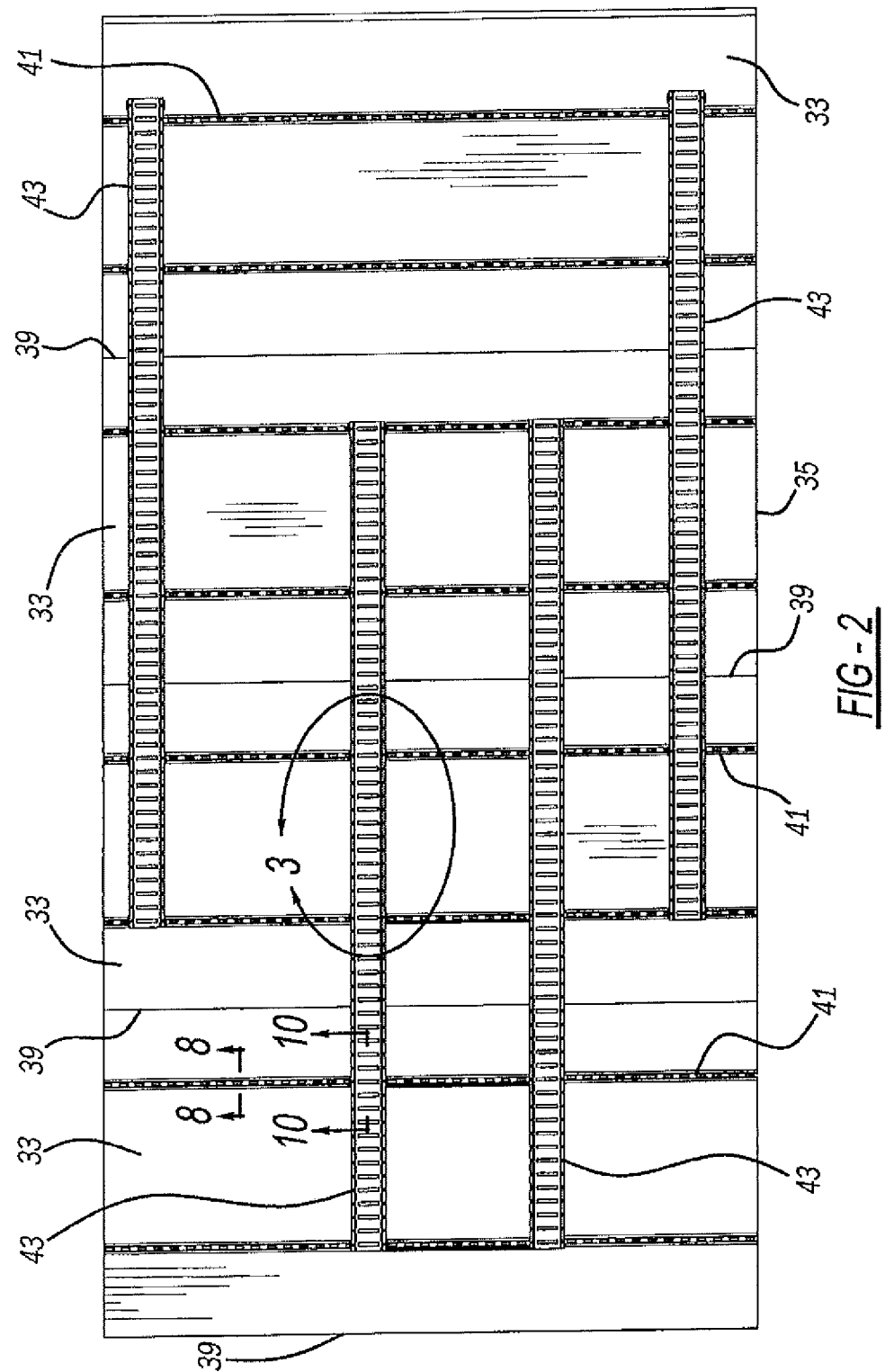
FIG. 2 is a side elevational view showing the present apparatus.
Figure 3:
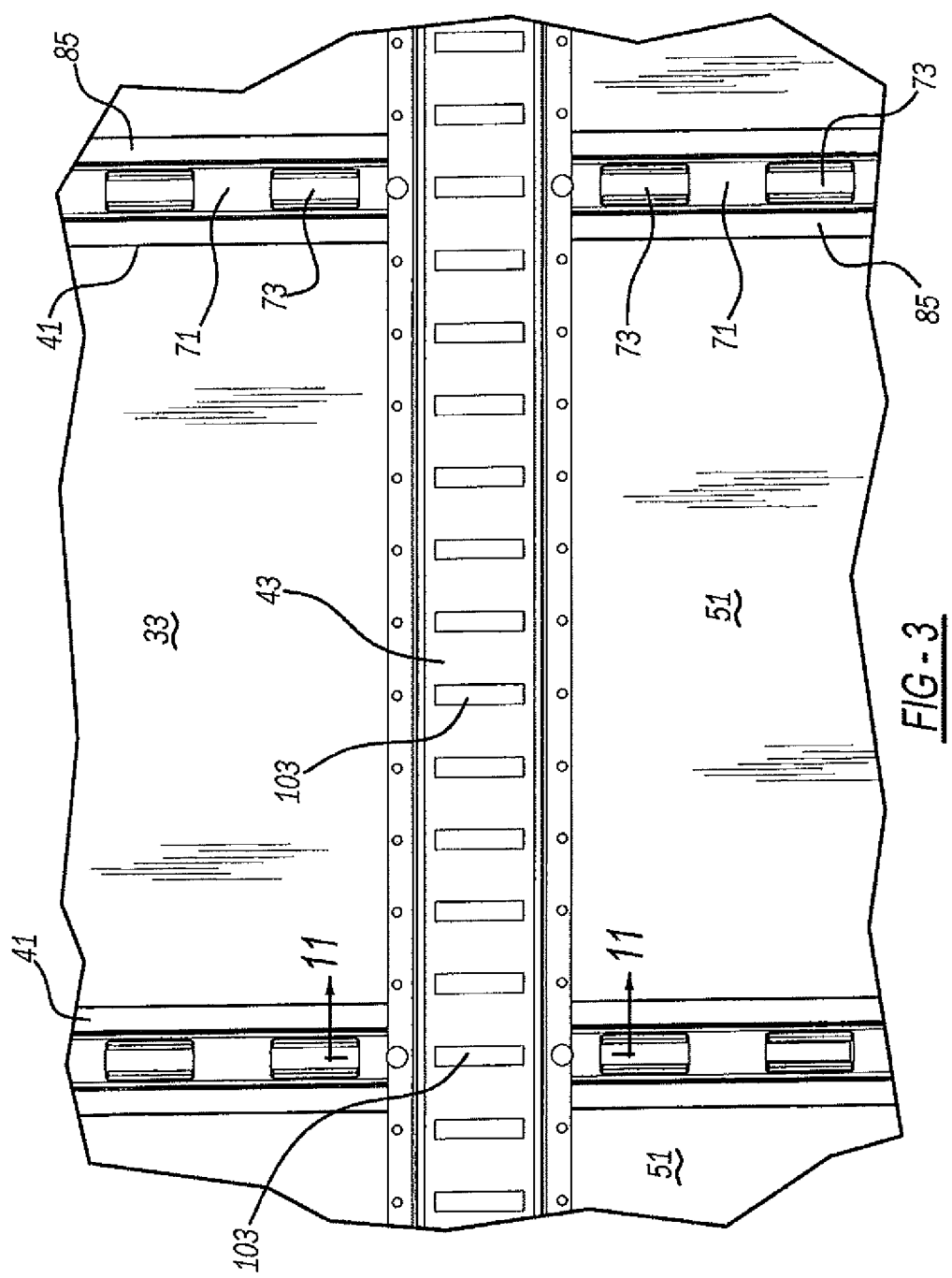
FIG. 3 is an enlarged side elevational view, taken within circle 3 of FIG. 2, showing the present apparatus.
Figure 4:
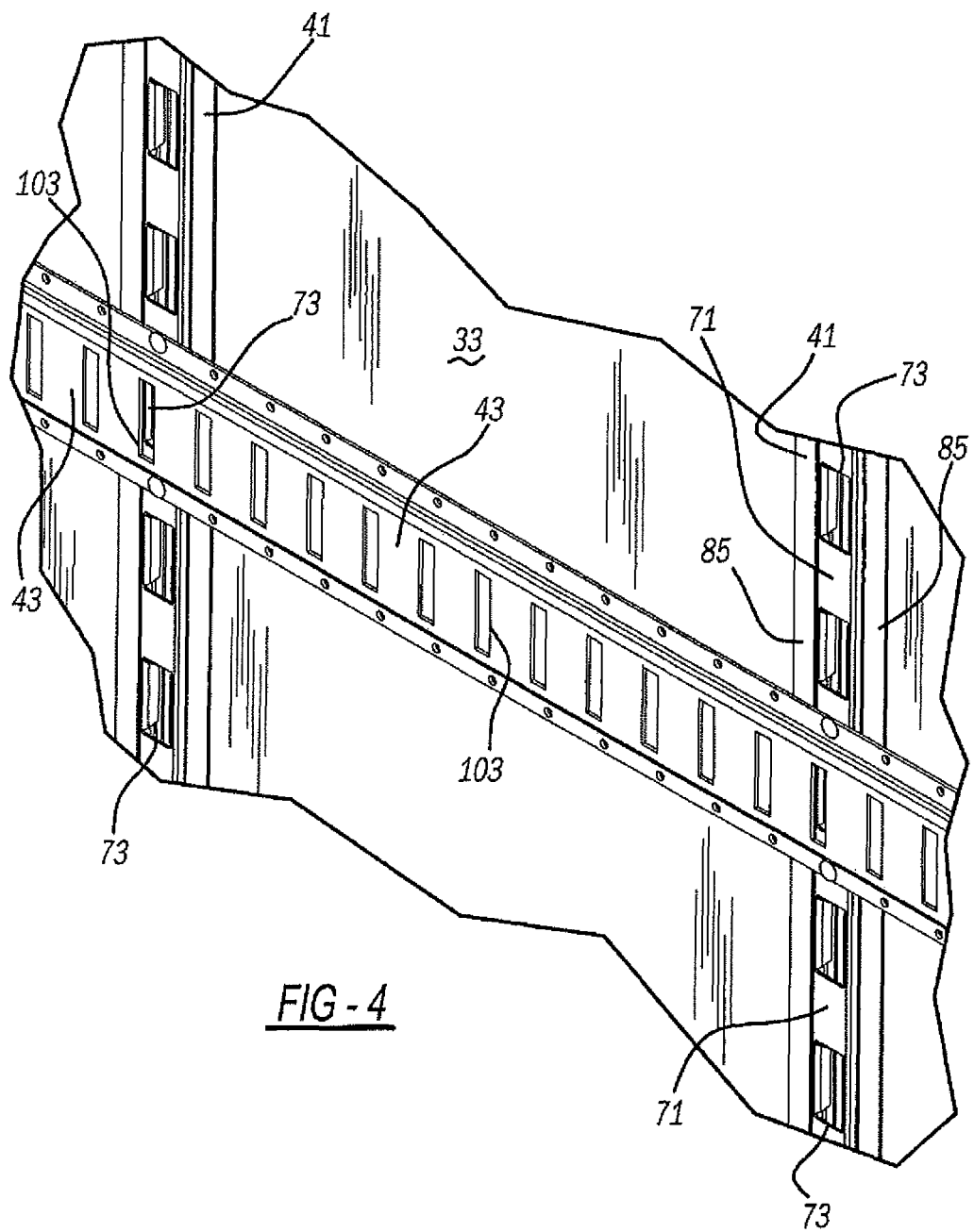
FIG. 4 is a perspective view, taken within circle 3 of FIG. 2, showing the present apparatus.

FIGS. 1 and 2 illustrate a cargo container or trailer 31, preferably a wheeled box trailer pulled by an automotive tractor or truck, which includes multiple sandwich panels 33 therein. Sandwich panels 33 serve as structural side and front wall panels 35 and 37, respectively, along generally vertical planes, which include vertically elongated logistics channels or posts 41 therein. Adjacent sandwich wall panels 33 are adhesively bonded together at their mating vertical peripheries 39. Generally horizontally elongated cargo securing or logistics tracks 43, and/or tie-down slats or rubrails are attached to and span between multiples of the vertical posts 41. Unless otherwise specified hereinafter, all of the trailer container constructions disclosed herein are also suitable for defining sections of other transportation containers such as an intermodal shipping container, a railroad car, a cargo carrying ship, a truck or van body, a residential moving/shipping/storage container or pod, and the like. An exemplary intermodal shipping container is disclosed in U.S. Pat. No. 5,678,715 entitled "Composite Stacking Frame Assembly for Shipping Container" which issued to Sjostedt et al. on Oct. 21, 1997, and is incorporated by reference herein.

Figure 8:
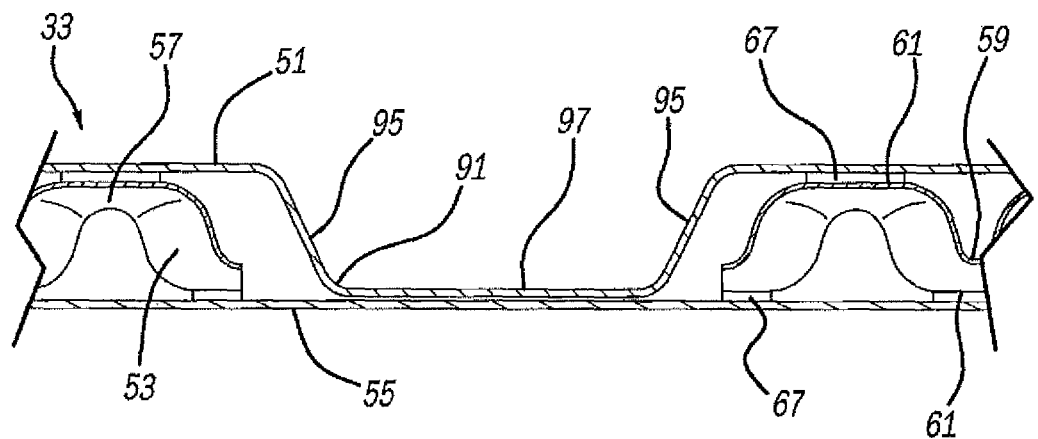
FIG. 8 is a cross-sectional view, taken along line 8-8 of FIG. 2, showing the sandwich wall of the present apparatus.

Sandwich panels 33 can be observed in greater detail in FIGS. 5, 6 and 8. Each sandwich panels 33 includes a first generally flat, interior face sheet 51, middle core sheets 53 and an opposite generally flat, exterior face sheet 55. Furthermore, core sheet 53 includes alternating peaks 57 and valleys 59, the external surface of each being defined by a generally flat land 61. Moreover, raised ridges 63 bridge or span between adjacent peaks 57 along a first width direction W but not in the perpendicular length direction L, where a more abrupt and steeply angled depression 65 is formed. Depressed areas 65 are located between adjacent peaks 57 along second direction L although each depressed area is elongated parallel to ridges 63 since the depressed areas are created on the back side of the ridges when the core sheet is formed into the desired contours from an initially flat workpiece sheet. Each ridge 63 is slightly lower than the generally flat lands 61 of the neighboring peaks 57. It is noteworthy that an elongation of ribs and direction W are generally perpendicular to a vertical elongation direction of depression 91 as is shown in FIG. 5.

Face sheets 51 and 55 are preferably metallic, such as low carbon steel, and core sheet 53 is preferably metallic such as aluminum. But any or all of these sheets may alternately be aluminum, low carbon steel, stainless steel or other metallic materials. Alternately, one or more of the sheets can be composite or polymeric materials to allow for larger widths than are typically available in metal sheets although some of the present benefits may not be achieved. The metal grain structure is also different in the roll/feeding direction L of core sheet 53 than in the cross-roll/cross-feeding direction W. The metallic core is preferably formed by embossing rollers as is disclosed in commonly owned U.S. Pat. No. 10,124,555 entitled "Sandwich Structure Including Grooved Outer Sheet," U.S. Pat. No. 9,925,736 entitled "Sandwich Structure," and U.S. Patent Publication No. 2015/0044494 entitled "Optional Sandwich Core Structures and Forming Tools for the Mass Production of Sandwich Structures," all of which are incorporated by reference herein.

The placement of ridges 63 and depressed areas 65 between the alternating peaks and valleys of core sheet 53 give the core sheet asymmetrical properties or characteristics after and during forming. For example, a length shrinkage factor fs, which is the initial core sheet length versus the formed end sheet length, is at least 1.08, and more preferably at least 1.10 in the roll direction L, as compared to a shrinkage factor fs of approximately 1.0 in the cross-roll/cross-feeding direction W. Furthermore, an out-of-plane shear stiffness of core sheet 53 is at least 1.3 times greater, and more preferably at least 1.4 times greater in the cross-roll/cross-feeding direction W, as compared to the roll/feeding direction L:

$$[L]\text{-}G_{WT}/G_{LT} \geq 1.3$$

Additionally, an out-of-plane shear strength of core sheet 53 is at least 1.05 times greater, and more preferably at least 1.1 times greater in the cross-roll/cross-feeding direction W, as compared to the roll/feeding direction L:

$$[L]\text{-}\tau_{WT}/\tau_{LT} \geq 1.05$$

In other words, the formed core sheet 53 can be torqued or flexed about an axis parallel to direction W considerably easily than in the perpendicular direction about an axis parallel to direction L due to the ridge and depression orientation and positioning. It should be appreciated that the core sheet thickness will vary after it is embossed. This asymmetrical core formation is very different than the symmetry desired in various prior constructions.

The compressive strength of the present sandwich panel 33 is maximized where the outer sheets are bonded to the core sheet, across the cross-sectional thickness (as viewed in FIG. 8). The relative density of this particular sandwich core layer can be calculated as followed:

$$\rho^* = \frac{f_s \cdot t_c}{C}$$

where $t_o$ is the initial sheet thickness of the core layer, C denotes the core layer height and $f_s$ is the shrinkage factor in the length direction L. Thus, the asymmetrical nature of the periodic array of peak and valley cells or dimples, as connected in one direction by raised ridges and separated in the other by steep depressed areas, advantageously provides for different directional forming and final product properties and characteristics. It is preferred that the open space between the sheets, including versions with multiple core sheets, not define a honeycomb pattern, since such a pattern exhibits differing performance and manufacturing characteristics. Adhesive 67 is the sole fastener between the lands 57 of core sheet 53 and the adjacent inner surfaces of sheets 51 and 55 in the presently preferred construction, although brazing may be alternately employed.

Reference should now be made to FIGS. 3, 4, 6 and 9. Each vertically elongated post 41 includes a central and solid body portion 71 with spaced apart and vertically elongated internal openings 73 defined by a continuous inner edge 75 that has a substantially rectangular true view shape. Lips 81 are folded or turned from a front (for a sidewall) vertical edge and a rear (for a sidewall) vertical edge of each opening 73. Thus, a distal edge 83 of each lip projects from a backside of each post 41 in a diagonally angled manner from the otherwise generally flat surface of body 71.

Furthermore, laterally extending flanges 85 extend from body 71 of post 41. Flanges 85 have inner and outer planar surfaces generally parallel to each other and to the solid portion of body 71. Body 71 inwardly projects a dimension x of less than 0.375 inch and more preferably less than 0.25 inch from innermost surface 87 of sandwich panel 33 as can be observed in FIG. 9. Thus, body 71 is inwardly raised beyond flanges 85 in a stepped manner but only a small amount to avoid cargo snags.

Posts 41 are preferably stamped or roll formed sheet steel but may alternately be aluminum or a reinforced polymeric or composite material. The lateral, top and bottom peripheral edges of each post 41 are pierced between stamping dies, as are opening edges 75. Each post 41 continuously extends at least a majority of a vertical dimension of the associated sandwich panel, and preferably the entire distance.

Figure 9:
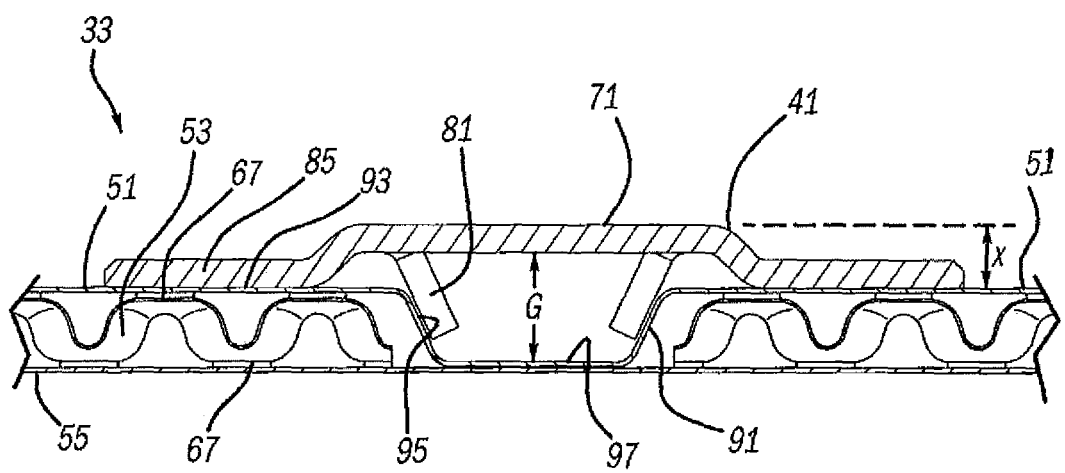
FIG. 9 is a cross-sectional view, taken along line 8-8 of FIG. 2, showing the sandwich wall and the post of the present apparatus.
Figure 10:
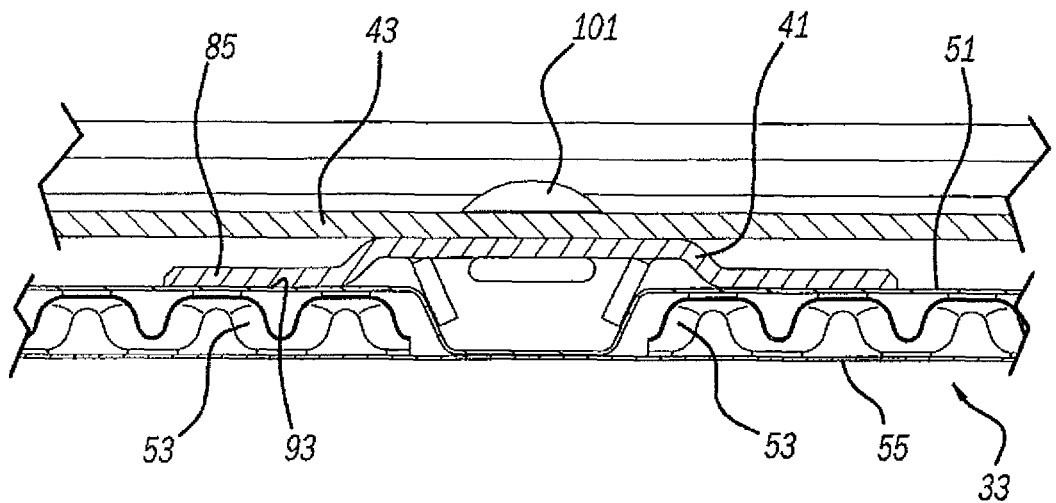
FIG. 10 is a cross-sectional view, taken along line 10-10 of FIG. 2, showing the sandwich wall, the post and the track of the present apparatus.

Referring now to FIGS. 3-5 and 8-13, vertically elongated depressions 91 are located within portions of inner face sheet 51 internal and away from vertical peripheral edges 39 (see FIG. 2). Depressions 91 are spaced away from but generally parallel to each other, preferably two depressions per sandwich panel. Core sheets 53 have a gap between them at depression 91 such that they are absent between depression 91 and the adjacent section of outer face sheet 55 to optionally allow a direct adhesive bond between the face sheets at this gap. Adhesive beads 93 are applied upon flanges 85 to directly bond the flanges 85 to inner face sheet 51 on either side of a depression 91 in a surface mount configuration. Further, lips 81 align with diagonal side surfaces 95 of depression 91 in sandwich panel 33 when each post 41 is inserted within the sandwich panel, as shown in FIG. 9. This lip-to-depression surface contact allows for supplemental mating surface area therebetween to optionally receive adhesive to additionally bond the lips to the diagonal surfaces of the depression in a three-dimensional retention manner without the need for hole piercing and fasteners such as by rivets or screws.

Body 71 of the post covers and bridges across depression 91 of sandwich wall panel 33. As can be observed in FIGS. 9 and 10, there is an ample open space or an air gap G between a plane of body 71 and a bottom 97 of depression 91 to allow hooks, straps, shoring beams, clips or other fasteners 99 (see FIG. 15) to extend through opening 73 and engage a backside of post 41. Gap dimension G is at least 0.31 inch and more preferably 0.32 inch. The spanning of post 41 across the depression in addition to the depression offset formation, provide enhanced structural rigidity to the assembly when in its final state.

Figure 21:
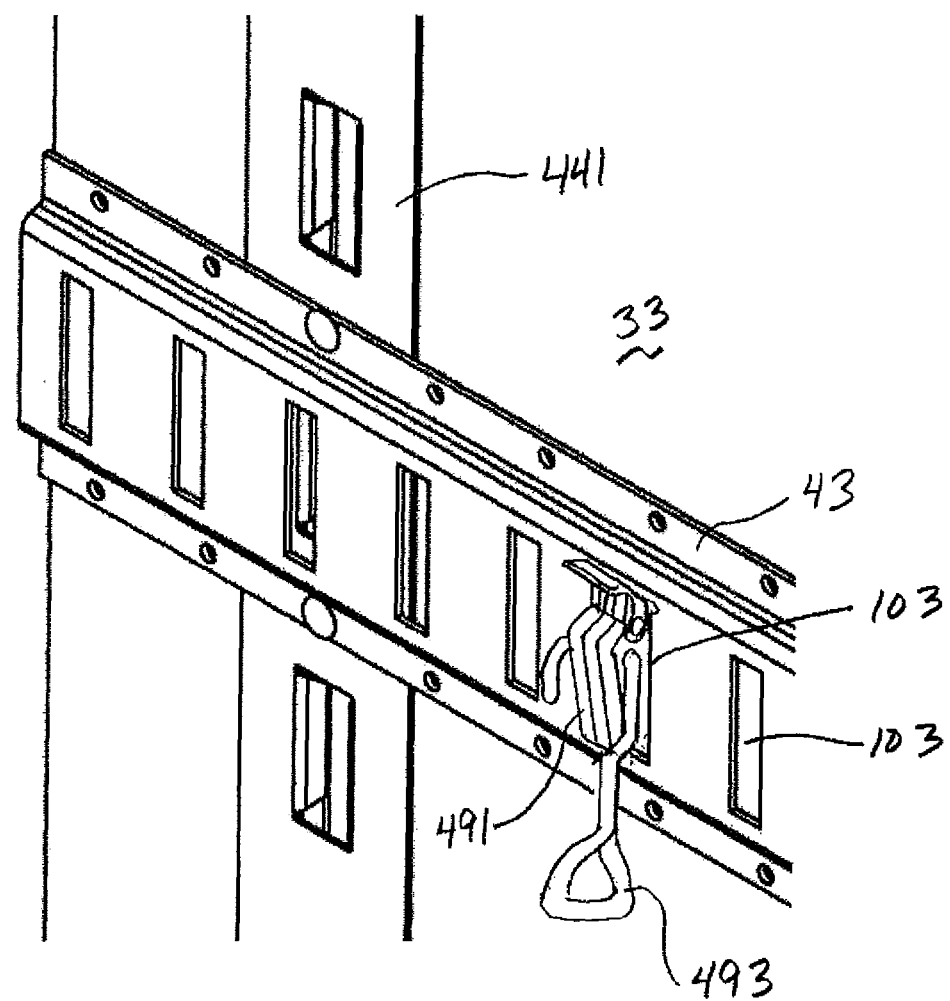
FIG. 21 is a fragmentary perspective view of a cargo retaining fastener usable with any of the embodiments disclosed herein.

As can be seen in FIGS. 3, 4, 10 and 11, each horizontally elongated cargo-contacting or retaining logistics track 43 is secured to two or more spaced apart posts 41, sometimes spanning multiple adjacent sandwich panels 33, by blind rivets 101. The final trailer assembler, dealer or end user can locate the track where desired and drill holes in body 71 of posts 41 to receive the rivets, but without piercing the wall panels 33. Gap G between post 41 and depression bottom 97 allows room for a shaft of a rivet setting gun to be inserted and then deform a buck-tail of the blind rivet when the track is secured to the posts. Clips 491 (see FIG. 21), hooks 493, brackets shoring beams, supplemental decks, divider boards, straps, and cargo nets may be removeably attached within spaced apart and elongated slots 103 of horizontal tracks 43 via locking lugs, hooks or bolt head fasteners. It is noteworthy that some of slots 103 overlap openings 73 in posts 41 to provide additional fastener room on a backside thereof.

Figure 12:
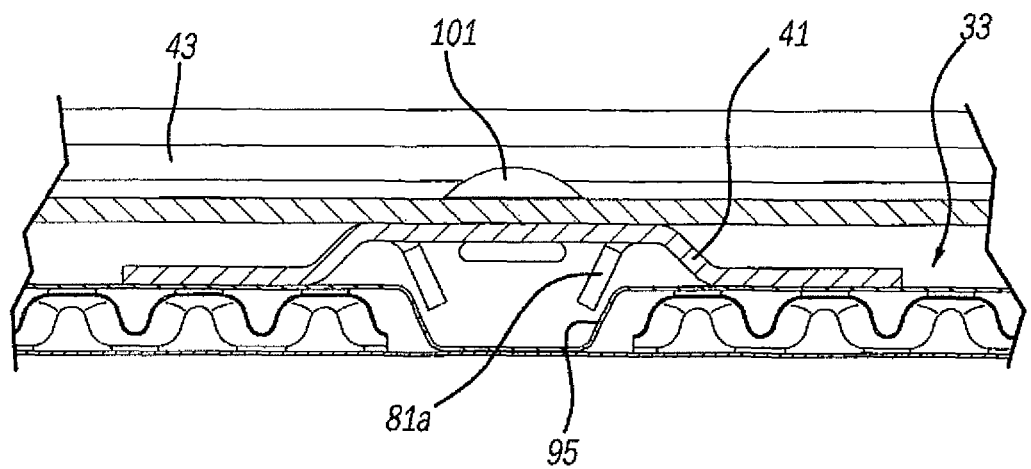
FIG. 12 is an enlarged top elevational view showing a second embodiment of the present apparatus.
Figure 13:
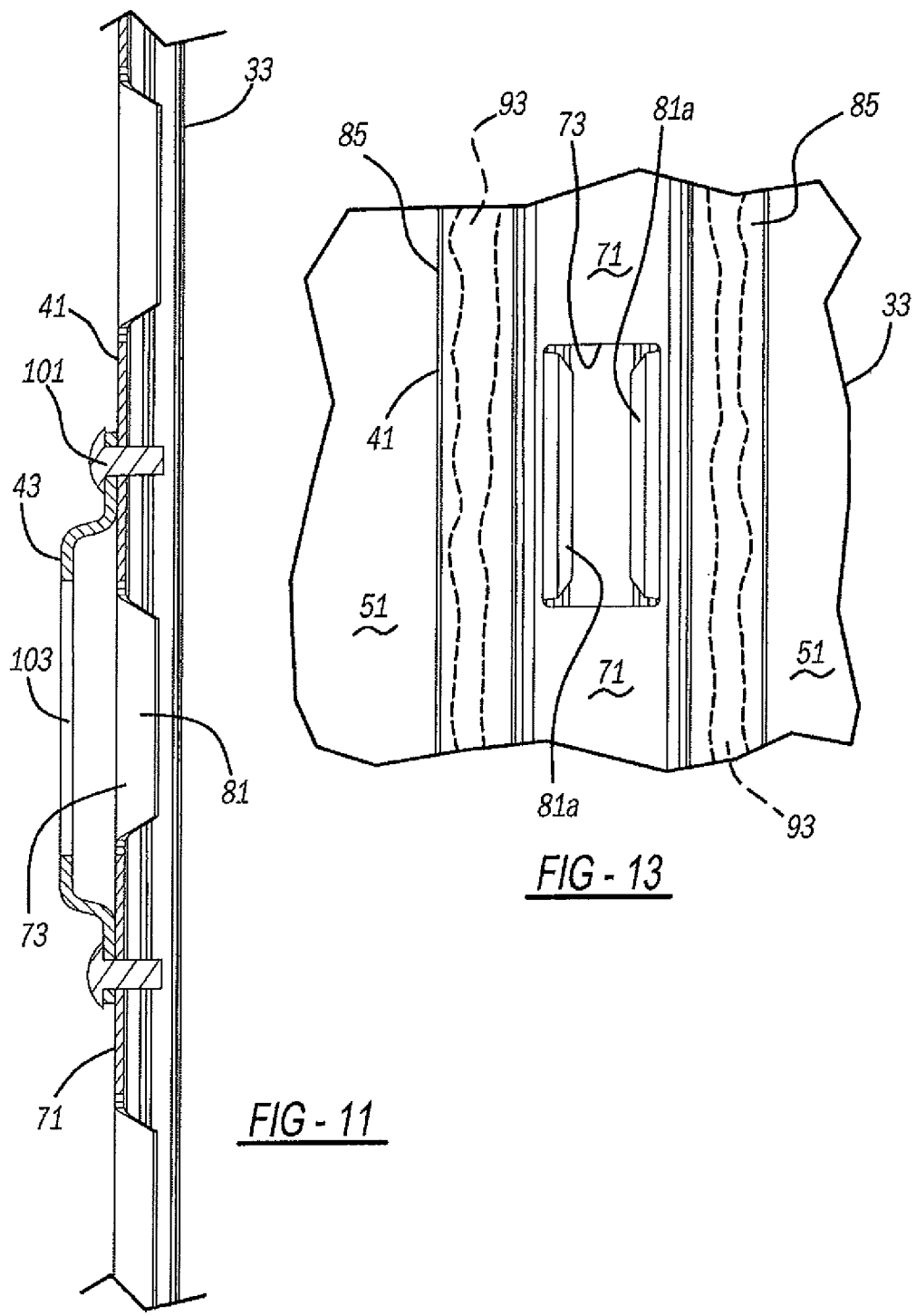
FIG. 13 is an enlarged side elevational view showing the second embodiment of the preset apparatus.

FIG. 12 shows a second embodiment of the present apparatus. Everything is the same as the prior embodiment, however, lips 81a are spaced away from diagonal surfaces 95 of depression 91. Thus, there is no adhesive between the lips and diagonal surfaces 95 in this configuration. Lips 81a assist with post-to-sandwich alignment but also provide some tolerance variations. Furthermore, the distal edges of lips 81a may abut a removeable fastener head.

Figure 14:
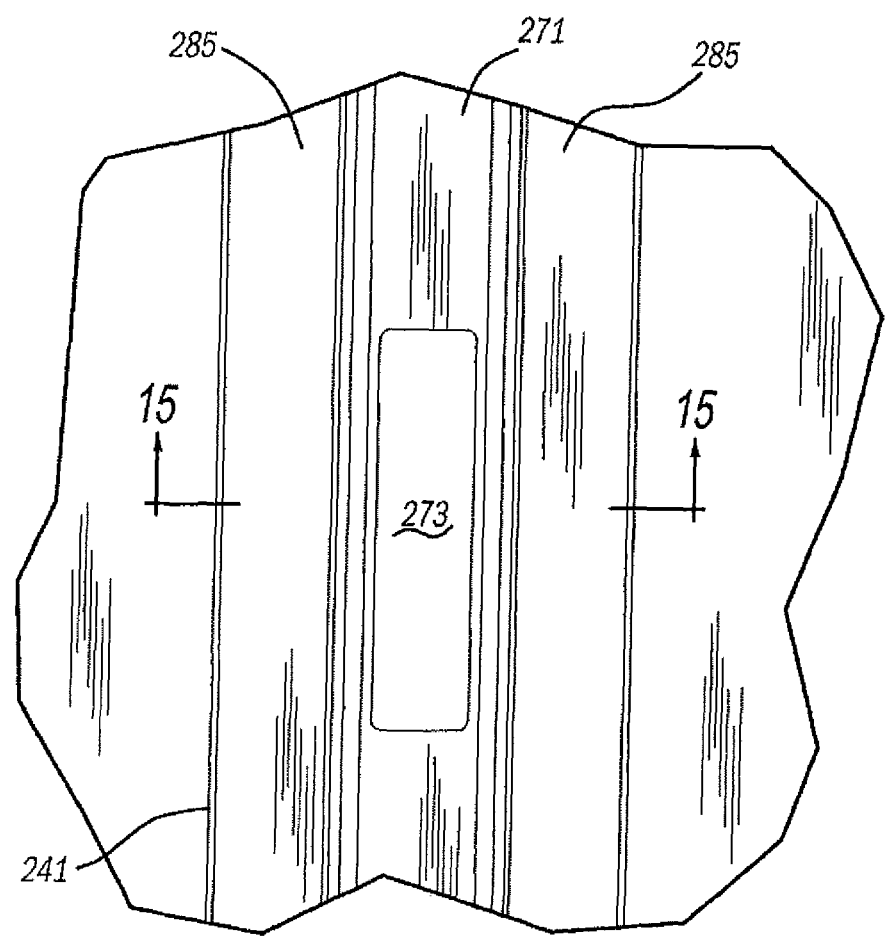
FIG. 14 is an enlarged side elevational view showing a third embodiment of the present apparatus.
Figure 15:
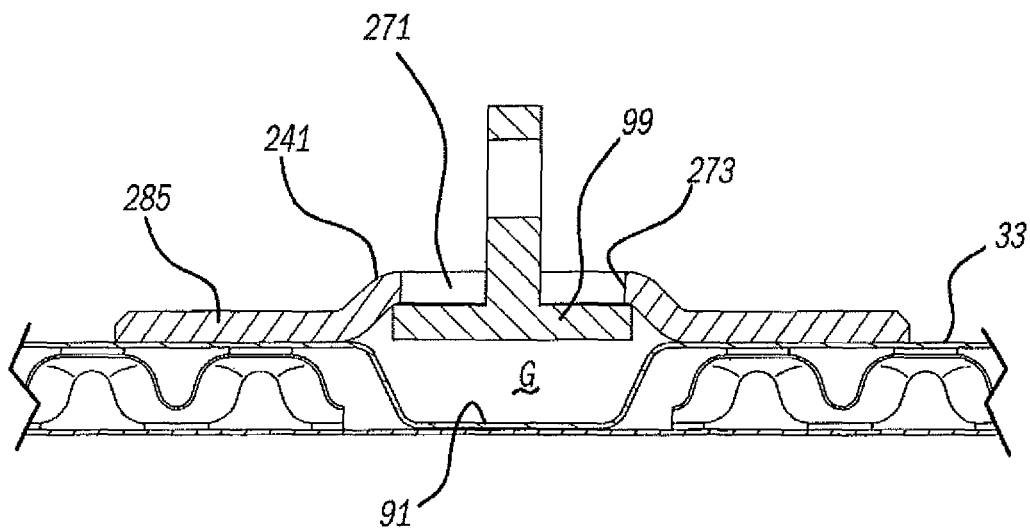
FIG. 15 is a cross-sectional view, taken along line 15-15 of FIG. 14, showing the third embodiment of the present apparatus.

FIGS. 14 and 15 illustrate a third variant of a vertical post 241. This post 241 is similar to the aforementioned versions and includes a solid body 271, flanges 285 and elongated openings 273. However, no bent lips are provided. The sandwich panel is the same as above described. Cargo securing strap hooks or cross-trailer beam fasteners 99 may be directly received into and engage the backside of post body 271 adjacent one or more of openings 273.

Figure 16:
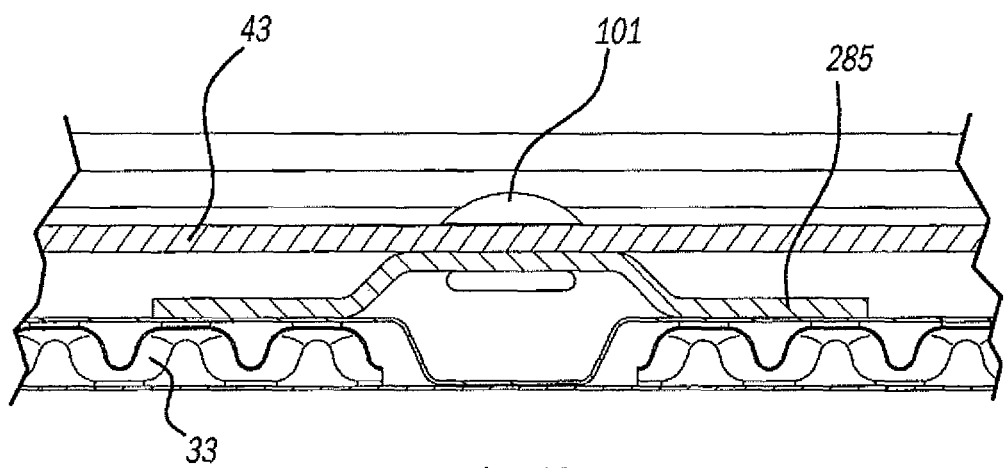
FIG. 16 is a cross-sectional view showing a fourth embodiment of the present apparatus.

Turning next to FIG. 16, a fourth embodiment of the present apparatus is shown. It includes vertical logistics posts 285 and a sandwich like that of the prior version but with horizontal logistics track 43 secured to a central body portion 271 thereof by blind rivet 101 or a second fastener. Post 285 may or may not include elongated openings therein.

Figure 17:
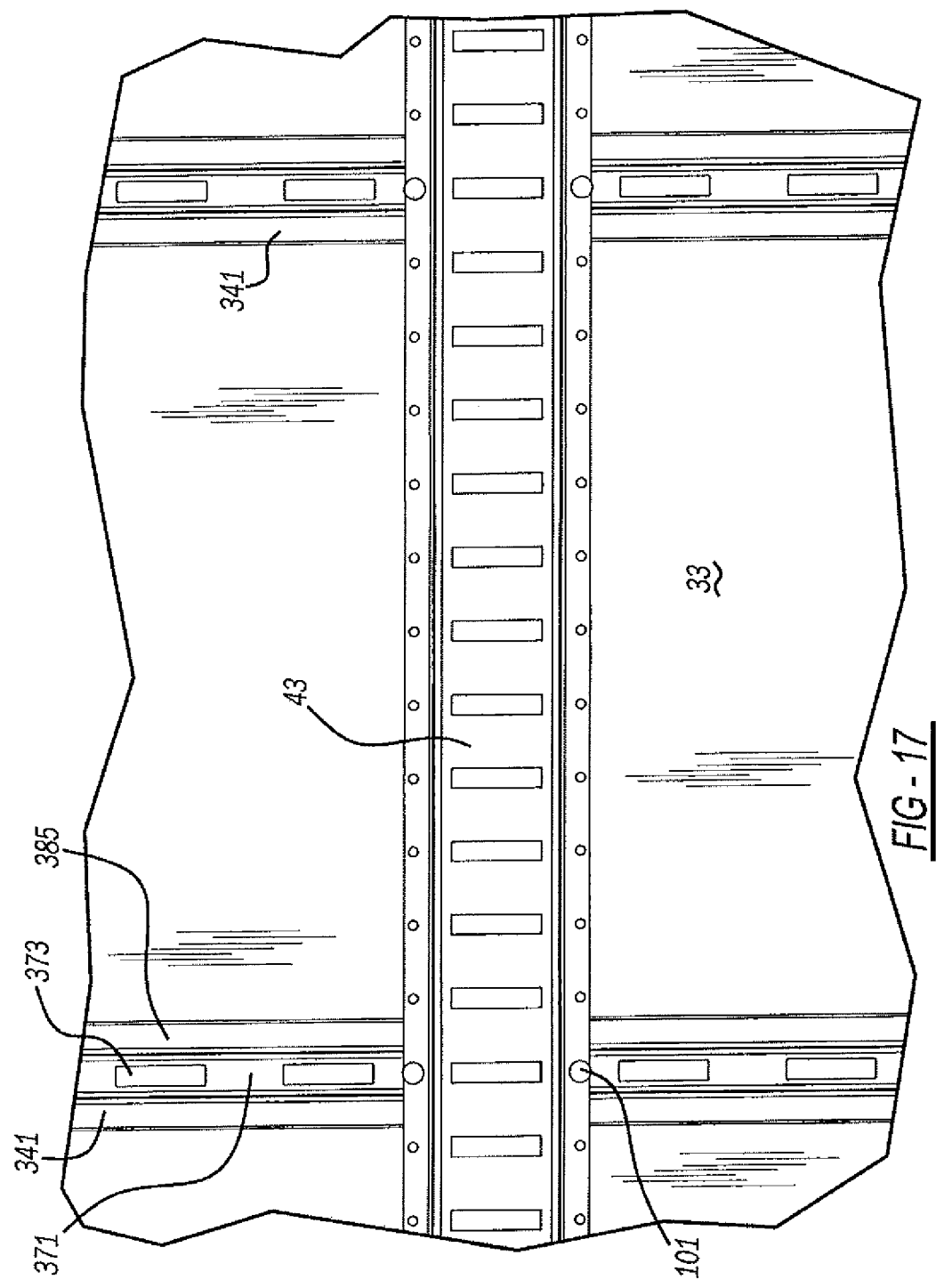
FIG. 17 is a side elevational view showing a fifth embodiment of the present apparatus.
Figure 18:
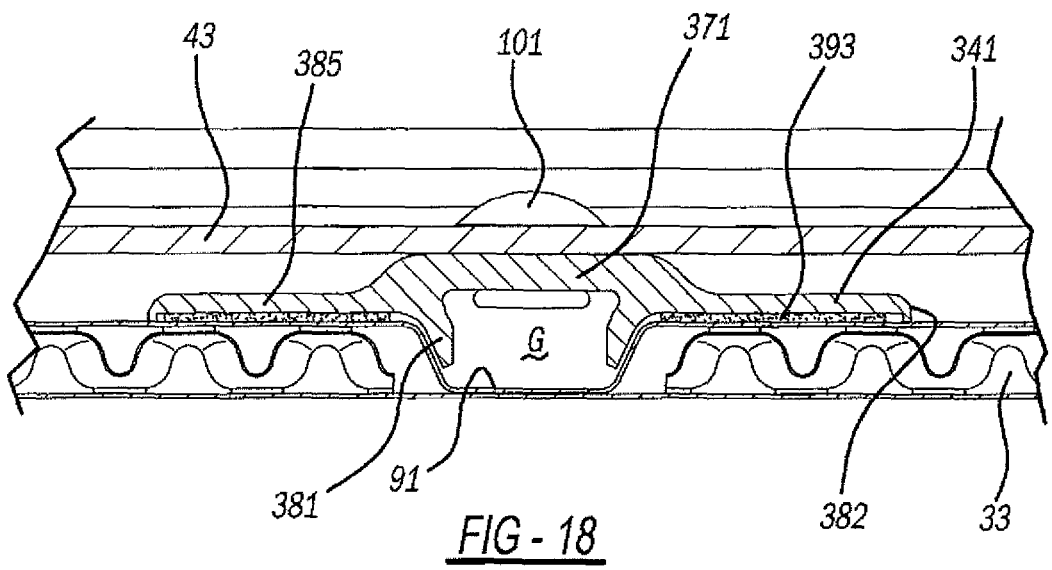
FIG. 18 is a cross-sectional view showing the fifth embodiment of the present apparatus.

FIGS. 17 and 18 show yet a fifth embodiment of the present apparatus. A vertical logistics post 341 is preferably extruded aluminum and includes lips 381 backwardly projecting from a thicker intermediate segments thereof, which join entirely and continuously solid central body portion 371 to lateral flanges 385. Openings 373 are optional but not needed in this version to create the undercut lips 381 which continuously extend from a top end to a bottom end of the post. Holes are drilled in body 371 to receive blind rivets 101 for attaching spanning horizontal logistics tracks 343. Furthermore, small extending dams 382 project from a backside of each flange 385 near a periphery thereof to deter adhesive 393 from flowing therepast when post 341 is pressed against the interior face sheet of sandwich wall panel 33 otherwise internally covering and spanning across depression 91 in the panel. Dams 382 serve to set the post flange-to-sandwich spacing within which adhesive 393 is located.

Figure 19:
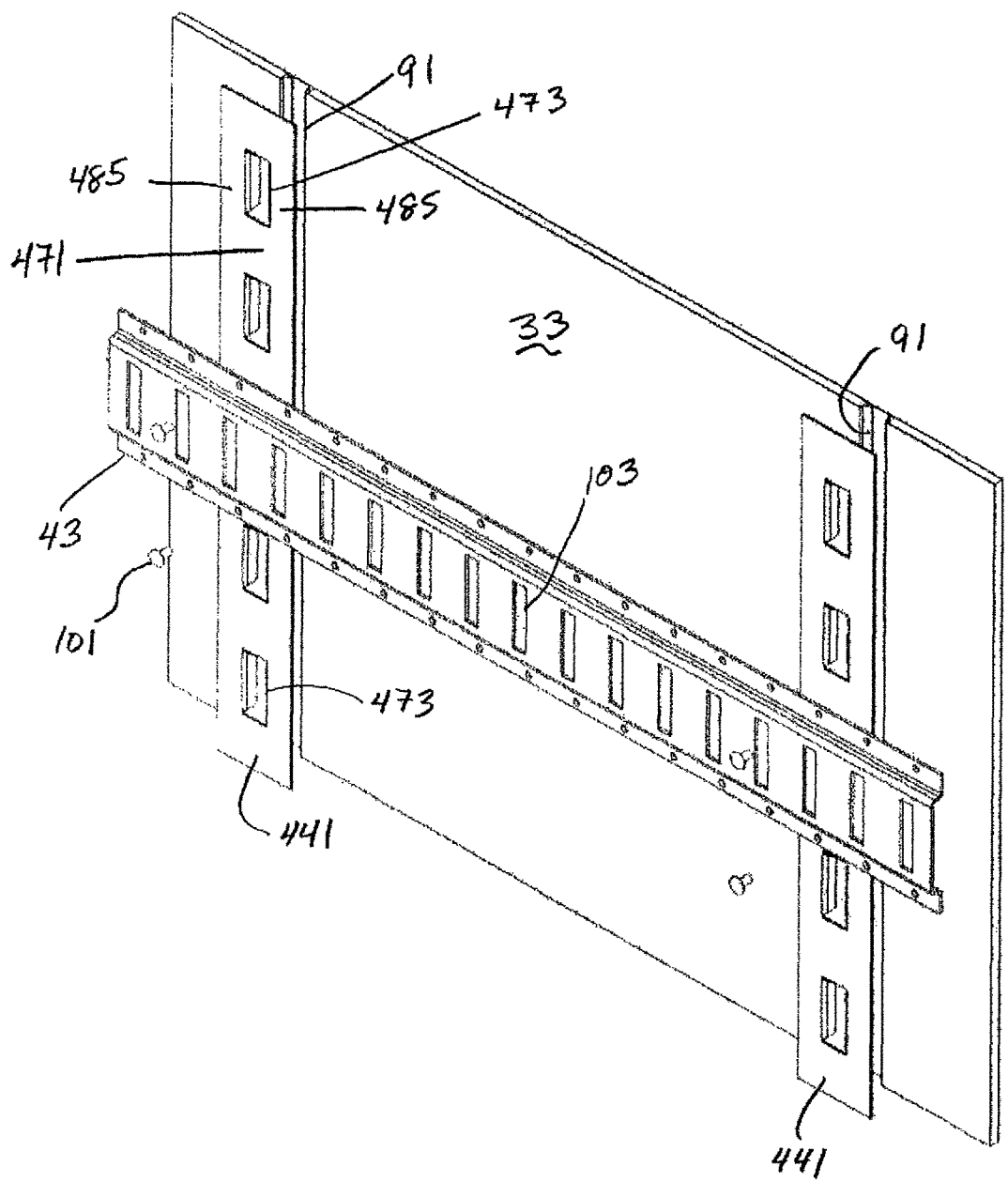
FIG. 19 is an exploded perspective view showing a sixth embodiment of the present apparatus.
Figure 20:
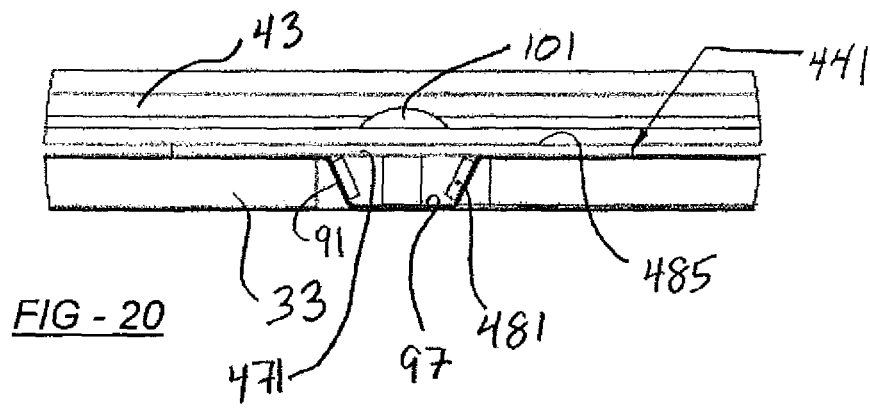
FIG. 20 is a top elevational view showing the sixth embodiment of the present apparatus.

FIGS. 19 and 20 show a sixth embodiment of the present apparatus. Sandwich wall panel 33 and horizontal logistics track 43 are the same as described hereinabove. Lateral flanges 485 and a central body portion 471 of each vertical post 441, however, are substantially flat and co-planar without steps therebetween, Flanges 485 are adhered to the inner surface of sandwich 33 and central body portion 471 spans across depression 91 with the air gap between the central body and bottom 97 of depression 91. While this gap is not as large as the prior embodiments, the post has a lower profile to reduce cargo snagging. Lips 481 also assist in depression alignment.

The manufacturing process will now be discussed. The post is preferably stamped or extruded from metallic material. Thereafter, it is cut to the desired lengths. Adhesive is then pumped or roll coated onto the backside surface of the post flanges and optionally the post lips. The post lips (if present) are used to assist in alignment with the sandwich depression, which may avoid the need for an extra jig feature. Next, the adhesive covered backside of the post flanges are placed and compressed against an epoxy coated, painted or coil coated inside surface of the inner face sheet of the sandwich panel. This is done while the sandwich panels are oriented in a generally horizontal condition which allows gravity to hold and compress the posts to the sandwich during adhesive curing. No rivets or other mechanical fasteners are used between the posts and sandwich.

The posts and sandwich wall panel are manufactured and assembled together in a modularized manner at a first manufacturing plant location prior to shipment to the trailer assembly site, and prior to adjustment and/or installation of the cargo-contacting horizontal logistics tracks by the dealer or end use customer. Moreover, it is expected that the assembled post-to-sandwich panel pull-out force (perpendicular to the interior face sheet plane) will be at least 800 pounds per fastener (e.g., using a standard flanged fastener nut ¼"-20 thread).

While various embodiments of the present invention have been disclosed, it should also be appreciated that other variations may be employed. For example, other dimensions and shapes may be provided for the core sheet and channels, however, many of the manufacturing advantages and property strengths will not be achieved. It is alternately envisioned that the core may be foam with or without an intermediate metallic sheet, although some of the preferred advantages may not be realized, such as recyclability. It should also be appreciated that any of the preceding embodiments and features thereof can be mixed and matched with any of the others in any combination depending upon the final product and processing characteristics desired. Variations are not to be regarded as a departure from the present disclosure, and all such modifications are intended to be included within the scope and spirit of the present invention.

The invention claimed is:

1. A cargo carrying apparatus comprising:
  (a) at least one sandwich panel, defining at least part of a cargo carrying area, comprising:
    (i) an exterior face sheet;
    (ii) an interior face sheet;
    (iii) at least one core coupling the interior face sheet to the exterior face sheet; and
    (iv) an elongated depression located in the interior face sheet; and
  (b) an elongated post contacting against and being attached to the interior face sheet without mechanical fasteners; and
  (c) an air gap being present between a central portion of the post and a bottom of the depression, the air gap being at least twice a thickness of the central portion of the post.

2. The apparatus of claim 1, wherein each of the cores includes a metallic sheet comprising alternating peaks and valleys, each of the cores extends a majority of length and width dimensions of the face sheets, and the core being absent between the depression and an adjacent section of the exterior face sheet.

3. The apparatus of claim 2, wherein:
the core further comprises raised ridges spanning between adjacent pairs of the peaks, and the ridges are elongated in a direction substantially perpendicular to a substantially vertical direction of elongation of the post and the depression after they are assembled to define the cargo carrying area;
the face sheets are all metallic;
the core is adhesively bonded to the face sheets; and
the post is adhesively bonded directly to the inner surface of the interior face sheet.

4. The apparatus of claim 1, wherein the post further comprises at least one lip extending from a backside of the body, the lip projecting toward the bottom of the depression.

5. The apparatus of claim 4, wherein the at least one lip includes a pair of lips bent from opposite edges of a vertically elongated opening in the central portion of the post, and the lips are diagonally oriented relative to the central portion of the post.

6. The apparatus of claim 1, further comprising lips projecting from a backside of the post contacting against diagonal side surfaces of the depression.

7. The apparatus of claim 1, wherein:
the elongated post comprises spaced apart and elongated openings being located in the central portion of the post, the openings being aligned with the depression in the interior face sheet;
the depression and the post are vertically elongated; and
the sandwich panel is part of a side or front wall of a wheeled trailer.

8. The apparatus of claim 1, wherein:
the elongated post comprises spaced apart and elongated openings being located in the central portion of the post, the openings being aligned with the depression in the interior face sheet;
the depression and the post are vertically elongated; and
the sandwich panel is part of a side or front wall of a truck or van body.

9. The apparatus of claim 1, wherein:
the elongated post comprises spaced apart and elongated openings being located in the central portion of the post, the openings being aligned with the depression in the interior face sheet;
the depression and the post are vertically elongated; and
the sandwich panel is part of a side or front wall of a shipping or storage container.

10. The apparatus of claim 1, further comprising:
a substantially horizontally elongated logistics track including multiple spaced apart slots and an elongated, substantially rectangular periphery; and
mechanical fasteners securing the logistics track to the post.

11. The apparatus of claim 1, further comprising:
flanges laterally extending from the central portion of the post;
the central portion of the post being located closer to a longitudinal centerline of the cargo carrying area than the flanges with a step therebetween;
the central portion being substantially parallel to a nominal flat inner surface of the sandwich panel; and
the central portion being spaced from the nominal flat inner surface of the sandwich by no more than 0.375 inch.

12. The apparatus of claim 1, wherein the central portion of the post is inwardly located from a nominal flat inner surface of the sandwich panel by no more than 0.25 inch.

13. The apparatus of claim 1, wherein the central portion of the post is inwardly located from a nominal flat inner surface of the sandwich panel by no more than a metallic sheet thickness of the central portion.

14. The apparatus of claim 1, wherein multiples of the post are attached to one of the at least one sandwich panel at a first manufacturing location as a preassembled module prior to shipment to a final trailer assembly location.

15. The apparatus of claim 1, wherein there are multiples of the depression spaced apart from each other in one of the at least one sandwich panel, the multiple depressions are substantially parallel to each other, and the multiple depressions are spaced away from vertical peripheries of the one sandwich panel which acts as a trailer side wall.

16. The apparatus of claim 1, wherein at least a majority of the post is outside of the depression to allow the air gap therebetween.

17. A cargo carrying apparatus comprising:
(a) a sandwich wall panel comprising:
    (i) metallic face sheets;
    (ii) at least one metallic core located between the face sheets, the core comprising alternating peaks and valleys each of a rounded true view shape; and
    (iii) an elongated depression located in one of the face sheets; and
(b) a vertically elongated logistics post comprising:
    (i) a vertically elongated body laterally bordered by flanges, the body being offset from the flanges;
    (ii) spaced apart elongated openings being located in the body, the openings being aligned with the depression in the one face sheet;
    (iii) the flanges of the post contacting against and being attached to the one face sheet;
    (iv) at least one lip extending from a back side of the body adjacent a lateral edge of at least one of the elongated openings, the lip projecting toward the bottom of the depression; and
(c) at least a majority of the post being outside of the depression.

18. The apparatus of claim 17, wherein the at least one core is absent between the depression and the opposite face sheet, and the depression is located between vertical peripheral edges of the sandwich wall panel.

19. The apparatus of claim 17, wherein the at least one lip includes a pair of lips bent from opposite edges of each of the elongated openings, and the lips are diagonally oriented relative to the body of the post.

20. The apparatus of claim 17, wherein the lips of the post contact against diagonal side surfaces of the depression.

21. The apparatus of claim 17, further comprising:
a substantially horizontally elongated logistics track including multiple spaced apart slots and an elongated, substantially rectangular periphery; and
mechanical fasteners securing the logistics track to the post.

22. The apparatus of claim 17, wherein there are multiples of the depression spaced apart from and parallel to each other, the panel is a wheeled trailer side wall.

23. A cargo carrying apparatus comprising:
(a) a vertical sandwich wall panel comprising:
    (i) face sheets;
    (ii) at least one core located between the face sheets; and
    (iii) multiple elongated depressions located in one of the face sheets, the depressions being spaced apart, substantially parallel and spaced away from vertical peripheries of the sandwich wall panel; and
(b) multiple vertically elongated logistics members, each comprising:
    (i) a vertically elongated central portion spanning across an associated one of the depressions;
    (ii) spaced apart elongated openings being located in the central portion, the openings being aligned with the associated one of the depressions;
    (iii) adhesive attaching the member against the sandwich wall panel;
    (iv) spaced apart projections extending from a back side of the central portion and extending into the depression;
(c) at least a majority of the members being outside of the depressions;
(d) a fastener being attachable through the central portion of at least one of the members without contacting the sandwich wall panel; and
(e) the sandwich wall panel is part of a wheeled box trailer side wall.

24. A method of manufacturing a cargo container, the method comprising:
(a) applying adhesive to at least one of: (i) a flange of an elongated post or (ii) an interior face sheet of a sandwich wall structure;
(b) aligning a lip projecting from the post with a depression in the interior face sheet of the sandwich wall structure;
(c) adhesively attaching the post to the sandwich wall structure while allowing a gap to exist between a central section of the post and a bottom of the depression; and
(d) causing at least a majority of the post to be outside of the depression after adhesive curing.

25. The method of claim 24, further comprising preassembling the post to the sandwich wall structure as a module prior to shipping the module to a remote trailer assembly location, the post continuously extending from a top edge to a bottom edge of the sandwich wall structure.

26. The method of claim 24, further comprising:
using the sandwich wall structure as a side or front wheeled trailer wall;
attaching a substantially horizontally elongated logistics track to multiples of the post without a fastener therebetween contacting the sandwich wall structure; and
the core being sheet metal which comprises alternating peaks and valleys.

27. The method of claim 24, wherein the adhesive attachment occurs while the sandwich wall structure is substantially horizontal to allow gravity to assist the post to remain in contact with the interior face sheet during the curing, and the post is a vertically elongated post when the sandwich wall structure is adapted to be vertically mounted as part of the cargo container.

* * * * *